May 30, 1950 E. L. CORBETT 2,510,011

BUSY TONE CALL SYSTEM FOR TELEPHONE EXCHANGES

Filed Aug. 10, 1945

INVENTOR.
EDWARD L. CORBETT

BY

Howard E. Thompson

Patented May 30, 1950

2,510,011

UNITED STATES PATENT OFFICE 2,510,011

BUSY TONE CALL SYSTEM FOR TELEPHONE EXCHANGES

Edward L. Corbett, New York, N. Y.

Application August 10, 1945, Serial No. 610,115

4 Claims. (Cl. 179—18)

Figure 1:
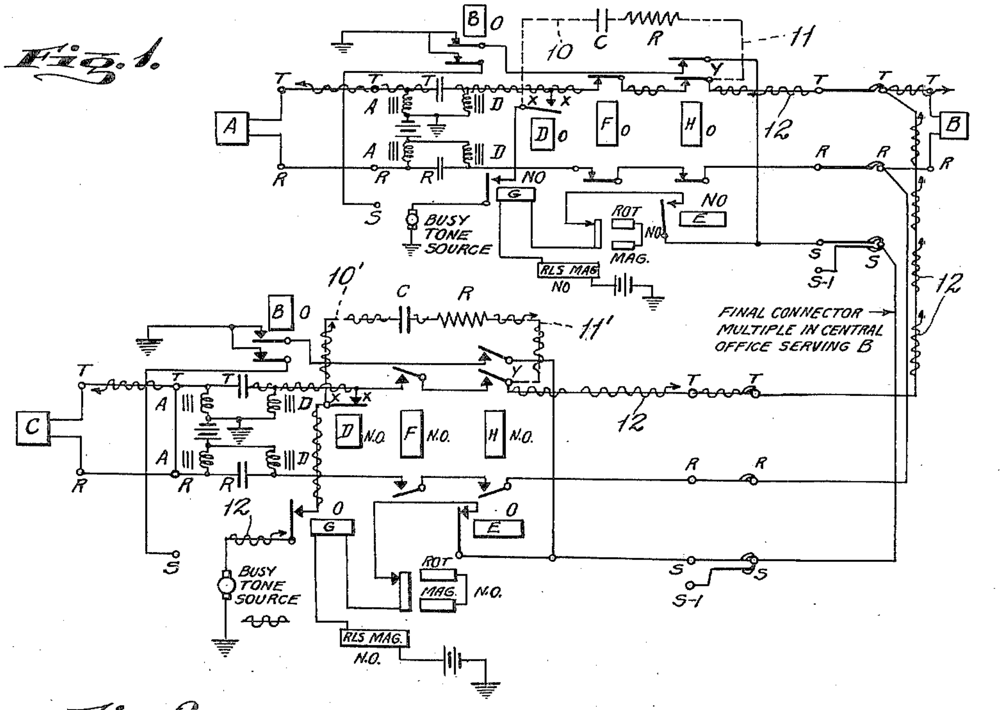
Figure 2:
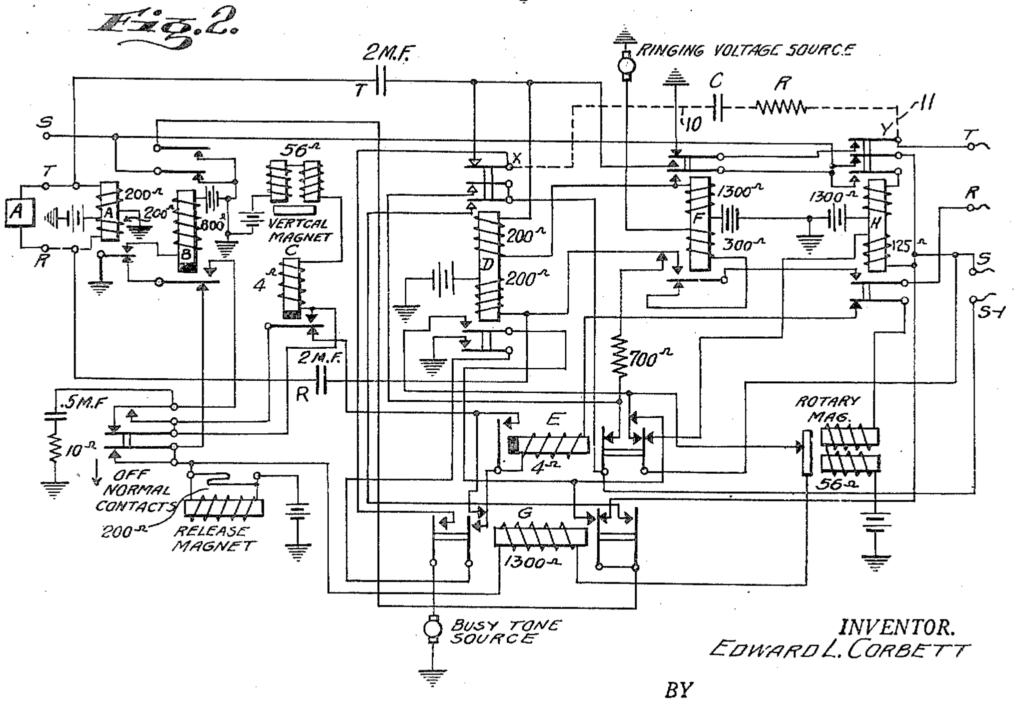

This invention relates to what may be termed a call signal system wherein a subdued busy tone or signal is transmitted to one or both parties engaged in a conversation to signal to said parties so engaged that a third party is endeavoring to reach one of said two parties. More particularly, the invention comprises a slight modification to standard telephone exchange systems whereby a signal is introduced into two connected stations by giving a busy tone or modified busy tone in the connected stations to indicate to the two parties conducting conversation that a third party is endeavoring to reach one of said two parties. Further, the invention comprises transmission of such signal in a manner which will not interfere with or materially disturb conversation between the two parties. The novel features of the invention will be best understood from the following description when taken together with the accompanying drawing, in which certain embodiments of the invention are disclosed, and in which the separate parts are designated by suitable reference characters in each of the views, and in which:

Fig. 1 diagrammatically illustrates a typical two-way completed automatic or dial telephone connection showing all relays in the required operative and non-operative functional positions, with my improved wiring and devices, and a diagram illustrating a typical incoming call connection where a third party is attempting to establish a telephone connection with the existing two-way completed connection, and showing the relays in the required operative and non-operative functional positions with my improved wiring and devices; and Fig. 2 is a view similar to Fig. 1, showing a standard dial office connector circuit with all relays and associated mechanical equipment shown in the non-operated position and also showing my improvement.

It is the purpose of my invention to provide a means for warning or signalling either or both parties engaged in a two-way telephone conversation, that a third party is calling or attempting to call one of the two conversing parties by transmission to the conversing parties a busy tone.

It will here be understood that both parties are presumed to have full knowledge of the significance of the busy tone signal and recognize the same as a warning or indication that a third party is attempting to reach one of the two parties engaged in conversation. Knowing this, the said two parties will either terminate the conversation to permit the third party to reach one of them, or to continue conversation until such time as a second warning signal is received, and then realizing that the call is probably important, to momentarily terminate the connection on such conversation to allow the third party to reach the desired party. The third party making the call will not repeat the call promptly unless the call is urgent.

Some of the advantages of a call system of this type and kind will be the tendency to reduce long conversation over a telephone, thus making more equipment available for handling a greater volume of telephone calls. Further, this system affords means for providing a calling party who has a limited amount of time, to break in and place the busy signal on the line of both parties engaged in conversation, notifying them that a third party is attempting to reach them. The total number of attempts made by the calling party would serve as the indication as to the urgency of the call. The value of this system can be appreciated also from the standpoint of making important calls where the question of time is a factor, and also in emergency calls to a doctor's office, police or fire department, and so forth.

In connection with transmission of the busy tone signal, the third or calling party has complete control over the transmission of the signal, and in some instances, by pre-arrangement, a predetermined number of busy tones can designate, by way of what may be termed a code system, the importance of the call or the party making the call. For example, referring to Fig. 1, if C should be a frequent caller to B, and B was engaged in a long telephone conversation with A, C would originate a call to B, and of course, receive the busy tone. Under the present system, the busy tone would cause C to hang up his telephone. Under my new system, however, the busy tone would be transmitted to both A and B, and would indicate to both parties that a third party, in this case the party C, is attempting to contact one of them. If C was to keep his receiver off the hook for a period of time, sufficiently to permit fifteen impulses of busy tone, both A and B would be able to count off each busy tone impulse, and if a code system was established, be able to determine who was attempting to call either A or B. B recognizing the code would then immediately terminate conversation with A and explain that a party which he knows, namely party C, was urgently wanting to speak to him. It is here to be understood that B can later renew his conversation with A by originating another call after having received the important message.

The drawings are diagrammatic or schematic illustrations of standard telephone exchanges. In Fig. 1 is a functional schematic diagram showing stations A and B connected in a manner to conduct a normal two-way telephone conversation while station C in attempting to call B has received the busy tone due to the following conditions.

All relays shown in Fig. 1, are indicated in the O (operated) or N. O. (non-operated) positions. When the circuits were established between stations A and B, the operation of B relay placed a ground on the S terminal of station B. This ground is known as the "guard circuit," and protects station B from being seized by any other incoming station to his station while he is busy.

This so called "guard circuit" also provides the means of transmitting the busy tone to any or all calling parties who reach his guard terminals. This can be observed by inspection of the circuit of calling station C. When station C reaches the terminals of station B, the ground from the guard circuit, which was established when A and B were connected, is transmitted from the S terminal on the selector brush via the armature and contact of the E relay via the contact and armature of the rotary magnet through the winding of the G relay which operates, closing its armature and contact, and transmitting the busy tone voltage via the armature and back contact of the D relay to the calling party, station C. Under this condition, the operating battery in the G relay was supplied through the winding of the release magnet, and although capable of operating the D relay, will not operate the release magnet, hence the connection will be sustained.

All of the above operations cover the normal features of a conventional step by step final connector employed in dial telephone central offices and serves as a means of transmitting the busy tone to the calling party, which in the illustration given is the party C. In accordance with my invention, I provide a means of transmitting the busy tone to both of the engaged or connected stations, in other words, in the illustrations given, stations A and B, continue to transmit the busy tones to both stations as long as the third party, namely the party C desires to hold the line.

The magnitude or volume of the busy signal to stations A and B would be below conversation level and would not interfere with conversation, the said magnitude or volume of the busy signal being predetermined by selection of the values of a capacitor C and a resistor R arranged in the circuit which connects the source of the busy tone to both stations A and B. The value of the capacitor C in microfarads and the resistor R in ohms can be determined by local conditions. This wiring hook-up is required on all final connectors and for purposes of illustration in Fig. 1, this simple wiring hook-up is shown on the connector serving stations A and B, as well as the connector being used by station C. On stations A and B the wire extending from the relay D is shown at 10 in dotted lines, this wire extending to the capacitor designated by C, which in turn couples with the non-inductive resistor designated by R, from which extends wire 11, shown in dotted lines, the latter being coupled with terminal Y.

A similar hook-up is shown in station C where 10′ is equivalent to 11, the capacitor being designated by character C and the non-inductive resistor by the character R. It will here be noted that at 12 is shown along the several wires, spiralled arrows illustrating the direction of travel of the busy tone, starting from the busy tone source of station C, and extending to stations A and B, as well as to the calling station C.

My improvement in the station circuits will be understood from the foregoing, and the following statement.

Inasmuch as the busy tone is transmitted to the calling station C, via the armature and contact X on D relay associated with the connector switch serving calling station C, the placing of the capacitor and resistor between the X armature of the D relay and the Y armature of the H relay, as indicated by the wires 10′ and 11′, will provide a path for the busy tone to be transmitted via the T brush of the connector engaged by station C over the T connector bank terminal of station B to the T brush of the connector engaged by stations A and B and follow the path outlined by the spiralled arrows 12, thus transmitting the busy signal in two directions directly to station B and to station A via the armature and contact of the H and F relays. This is clearly shown in the upper portion of Fig. 1.

In view of the foregoing, it is obvious that station B, the station that has been called by station C will receive a busy signal of greater amplitude than station A, and by proper selection of capacitor and resistor values, it is possible to provide the audible busy tone only to the station whose final connector terminals were bridged by the calling party. In such instances, the busy tone would not be heard by station A, and station B only would receive the busy tone, knowing that another party was attempting to contact station B.

In Fig. 2 is shown a typical step by step hunting connector showing the full schematic wiring, and also indicating in dotted lines my new wiring hook-up. In this connection, the dotted line showing has been included in all showings to clearly set apart that which is new from that which is old and standard equipment. In this way, the invention becomes more clearly understood.

The operation of the connector switch illustrated in Fig. 2 is as follows:

It is to be presumed that station A has progressed step-by-step into the connector circuit. It can be assumed that station A is now connected to the two 200 ohm windings of the A relay by being extended in the usual manner through the automatic line finder and selector switches and transmission circuit wires T and R. When this connector circuit Fig. 2 is seized by station A, the receiver off the hook at station A operates the A relay. The A relay extends ground to the winding of the B relay and operates the B relay. The operation of the B relay performs the following functions:

1. Grounds the S terminal, thus holding the preceding line finder and selector switches in operation positions.

2. Prepares A circuit for future operation of the vertical stepping magnet.

3. Extends ground to the sleeve S brush of the connector.

The calling station A dials the third digit, which we will assume is number one. At the first opening of the dial impulse contacts on the instrument at station A the A relay will release and extends ground through the operated B relay contacts (the B relay is slow release and is in the operated position at this time) to off normal contacts to the C relay, through the C relay, operating same and through the vertical magnet, operating same. Inasmuch as the dial was operated for only one digit, only one impulse was transmitted, hence the A relay released just once and then re-operated.

The vertical magnet operated and mechanically stepped the switch shaft up to the first level or level number one. The operation of the switch shaft also operated the off normal contacts preparing A circuit for the rotary stepping of the switch. The slow release characteristic of the B and C relays keep them operated during the pulsing period.

When the dial impulse contacts on station A return to normal (closed position) the A relay re-operates and the vertical magnet releases. The switch, however, will remain in the vertical position as it is held mechanically, and will not release until the release magnet operates when the A relay reoperated, the C relay released and transferred the impulse circuit from the vertical magnet to the rotary magnet preparing for the final digit in the rotary position of the connector switch.

The calling station A dials the fourth and final digit, we will assume the digit to be number five. The A releases and reoperates five times the B relay being slow release remains operated during the dialing period. Due to the operation of the off normal contacts, the ground from the A relay is transmitted through the normally made contacts of the C relay to and through the non-operated contacts of the G relay to and through the winding of the E relay operating same, and to and through the winding of the rotary magnet, and operating same. In operating the E relay performs the following functions:

1. The E relay remains operated over the dialing interval due to its slow release characteristic and maintains A circuit to the rotary magnet, should the G relay operate while passing over unwanted busy terminals.

2. Removes the B relay ground through the 125 ohm winding of the H relay from the S sleeve brush on the connector.

3. Extends G relay battery to the S sleeve brush of the connector for busy test purposes.

Following the train of pulses originating from station A the rotary magnet operates and releases five times (five digits being dialed by station A) and mechanically advances the connector shaft in the rotary position to the fifth set of tip ring sleeve terminals on the incoming multiple bank, in this case the terminals of the line desired by station A.

If we assume that the called station B is idle, the T, R, S, S1 brushes or wipers on the final connector switch appearing in the upper right-hand corner of Fig. 2, will be connected mechanically to the T, R, S, incoming connector bank terminals associated with the line of the called station B. Due to station B being idle, the S sleeve terminal on the incoming connector bank terminals associated with B will have a battery voltage provided by the conventional subscriber line circuit not shown in Fig. 2. During this sequence of operation, the E relay will release at the duration of its slow release time.

The H relay partially operates on the battery available on the S sleeve terminal from the called stations line and performs the following functions:

1. Locks up through its own contacts to the B relay ground causing the H relay to fully operate.

2. Transmits ringing voltage and ringing voltage ground to the called station.

3. Connects ground to hold the cut off relay in the called line operated (cut off relay not shown).

4. Disconnects the rotary magnet circuit preventing further rotation of the connector switch should the calling station A again dial by accident.

5. Closes through the audible ringing tone to the calling station A.

With ringing voltage being transmitted to the called station, the bell on the called station will ring and we can assume that the called party answers by removing the receiver off the hook. This causes the F relay to operate and perform the following functions:

1. Locks up on the 1300 ohm winding to the B relay ground.

2. Disconnects the ringing voltage from the T and R of the connector brush and disconnects the audible ringing tone from the calling line.

3. Connects through the T and R of the called station to the two 200 ohm windings of the D relay for supplying talking battery and ground to the called station.

The conversation progresses (talking is conducted between stations via the two MF capacitors T and R in the T and R leads of the connector.

The calling station has complete control of all the switches in the particular circuit. Should the called station replace their receiver on the hook before the calling station replaces his receiver on the hook, the D relay will release but all of the switches will remain operated until the calling station hangs up.

From this description it can be seen that my invention does not interfere with the series of operations required of the connector to make a completed connection. If we can now assume that the called station B is busy, the T, R, S, S1 brushes or wipers on the final connector switch appearing in the upper right-hand corner of Fig. 2, will be connected mechanically to the T, R, S, incoming connector bank terminals associated with the line of the called station B. Due to station B being busy, the S sleeve terminals on the incoming connector bank terminals associated with station B will have a low resistance ground provided by the final connector that is serving the connection established by station B. This ground is placed on all of the incoming connector bank terminals associated with station B when it is busy. As a result of this ground on the S terminal of the called station B connector bank, the following operations take place in the connector under the control of station A.

Ground is transmitted to the S brush or wiper of the connector serving station A, Fig. 2, from that point the ground is transmitted to the armature of the E relay. The E relay has a slow release characteristic and has not, as yet, released, hence the ground on armature is transmitted to the front contact and, thence, to the back contact and armature of the rotary magnet, through the winding of the G relay and the winding of the release magnet. This circuit path operates the G relay but not the release magnet. When the G relay operated the following functions were performed. The G relay locked up through its own winding, when the E relay finally released. This circuit was provided as follows.

The ground that was previously supplied from the operated armature and front contact of the E relay is now transferred to the make before break contacts of the E relay and, thence, to the front contact of the G relay, to the operated armature of the G relay, to the operated armature of the B relay, through the made contact of the B relay to ground, locking the G relay through its own winding. Busy tone is now transmitted from the operated armature of the G relay, through the front contact to the upper armature, marked X of the D relay. It is at this point that my device or attachment accomplishes its purpose. The busy tone is transmitted from the back contact of the non-operated D relay, through the 2 M. F. T capacitor to the T side of the A relay and, thence, through all equipment previously set up in the progress of the connection and, finally, to the calling station A returning back over the R side of the circuit. In this manner, the calling station receives the busy tone which is standard and not part of my invention. My attachment which consists of a feed back circuit is connected to the upper armature, marked X on the D relay. As previously described, the busy tone is available at this point and is transmitted over circuit wiring indicated by dashed lines to a capacitor C through resistor R and connected to upper armature of the non-operated H relay marked Y and, then, to the T brush or wiper of the connector which is connected to the T connector bank terminal of the called station B, thence, over the station line to station B, returning over the R side of the line. In this manner, station B receives the busy tone. At the same time, the busy tone is also transmitted to station engaged with station B, through the final connector utilized by the station that station B was connected with.

The showing in Fig. 2 of the drawing is simply to more clearly illustrate the standard or conventional wiring diagram schematically of station A, and shows the station or connector in a non-operated position, whereas in Fig. 1, a briefer or more limited showing of the station A illustrates the same in operative position.

From another standpoint of describing the invention, it might be said that the attachment to connectors of telephone systems as herein described, may be referred to as a modification kit, terms which are commonly used in the trade. This term is used in the sense that the unit of assembly of the so called attachment or modification kit constitutes a unit which is simply added to or incorporated in conjunction with a known electrical hook-up of any type or kind.

From the foregoing, it will be apparent that my invention comprises a very simple and economical unit installation which may be readily hooked into or assembled with each common telephone connector and will operate without interference with existing telephone exchanges insofar as transmitting conventional calls is concerned. The unit, which consists of a capacitor of the postage stamp type and a carbon one watt resistor of the common radio type joined together in series and connected at the respective remaining two terminals with two lengths of insulated copper wire twenty-twenty-eight gauge, suitably mounted at the back of each connector switch and wired as previously specified to X armature on relay D and Y armature on relay H. If desired the unit can be installed directly under the switch housing with the relay complement. Furthermore, the transmission of the busy signal coming from a third party can be controlled and regulated in the manner set forth to not materially interfere with conversation being conducted between two parties. In fact, this signal may be so controlled as to be described as a peep signal and materially modified in comparison with the normal busy tone signal which is received, for example, by the third party attempting to reach one of two parties engaged in telephone conversation.

Having fully described my invention, what I claim as new and desire to secure by Letters Patent is:

1. The combination with the final connector switch of an automatic step-by-step telephone system having a bank wiper, a calling and a called station, a final connector multiple bank, a busy relay including an operating winding and a contact system, means whereby said operating winding is energized only when an attempt is made to establish a connection to said final connector multiple bank, a continuously operating source of busy tone, a circuit consisting of an electrical resistor and a capacitor connectible through said contact system under the control of the operating winding of said busy relay for interconnecting said source of busy tone with both said calling and called stations of said system, said resistor and capacitor having such magnitudes as will maintain said busy tone below conversation level and enable the continuance of conversation with the busy tone superimposed thereon, and means whereby said busy relay maintains said busy tone on both said calling and called stations throughout the time interval that said attempt is being made to establish said connection to said final connector multiple bank.

2. In an automatic step-by-step telephone system, a final connector switch having a bank wiper, a calling and a called station, a final connector multiple bank, a continuously operating source of busy tone, a busy relay including an operating winding and a contact system, means whereby said operating winding is energized only when an attempt is made to establish a connection with said calling or called stations, while said stations are in a busy condition, a circuit connected to said bank wiper and to the contact system of said busy relay, said circuit being connected in series with said source of busy tone and adapted to be connected by said contact system with said calling and called stations, said circuit comprising a resistor and a capacitor providing a resistive-capacitive path under control of the contact system of said busy relay for utilizing said busy tone as a warning signal at said calling and called stations, said resistor and capacitor being selected in value for maintaining the volume of said busy tone below conversational level and enable the continuance of conversation with the busy tone superimposed thereon, and means whereby said busy relay persistently maintains said busy tone on both said calling and called stations throughout the time interval that said attempt is being made to establish said connection to said final connector multiple bank.

3. In an automatic step-by-step telephone system, a final connector switch having a bank wiper, a calling and a called station, a final connector multiple bank, a continuously operating source of busy tone, a busy relay including an operating winding and a contact system, means whereby said operating winding is energized only when an attempt is made to establish a connection with said calling or called stations, while said stations are in a busy condition, a circuit connected to said bank wiper and to the contact system of said busy relay, said circuit being connected in series with said source of busy tone and adapted to be connected by said contact system with said calling and called stations, said circuit comprising an impedance path for controlling the amplitude of said busy tone impressed upon said calling or called station through the contact system of said busy relay for continuously maintaining said busy tone at a volume below conversation level for enabling the continuance of conversation with the busy tone superimposed thereon, and means whereby said busy relay persistently maintains said busy tone on both said calling and called stations throughout the time interval that said attempt is being made to establish said connection to said final connector multiple bank.

4. In an automatic step-by-step telephone system, a final connector switch having a bank wiper, a calling and a called station, a final connector multiple bank, a continuously operating source of busy tone, a busy relay including an operating winding and a contact system, means whereby said operating winding is energized only when an attempt is made to establish a connection with said calling or called stations, while said stations are in a busy condition, a circuit connected to said bank wiper and to the contact system of said busy relay, said circuit being connected in series with said source of busy tone and adapted to be connected by said contact system with said calling and called stations, said circuit comprising a tone transmission path containing separate electrical elements selected in value for passing a tone frequency which is continuously impressed upon said calling and called stations as a warning signal at an amplitude level below conversation level for enabling the continuance of conversation with the busy tone superimposed thereon, and means whereby said busy relay persistently maintains said busy tone on both said calling and called stations throughout the time interval that said attempt is being made to establish said connection to said final connector multiple bank.

EDWARD L. CORBETT.

REFERENCES CITED

The following references are of record in the file of this patent:

UNITED STATES PATENTS

| Number | Name | Date |
|---|---|---|
| 1,278,330 | Goodrum | Sept. 10, 1918 |
| 2,248,040 | Beaumont | July 8, 1941 |
| 2,278,752 | West | Apr. 7, 1942 |